United States Patent [19]

Genshpring et al.

[11] 4,029,041
[45] June 14, 1977

[54] BLOCKAGE INDICATOR FOR INTERNAL COMBUSTION ENGINE AIR CLEANER ELEMENT

[76] Inventors: Eduard Matveevich Genshpring, ulitsa 2-Gazovaya, 5, kv. 316; Zigmund Genrikhovich Bljumshtein, ulitsa Pavljukhina, 85, kv. 25, both of Kazan; Veniamin Evnovich Maev, Chernomorsky bulvar, 4, kv. 266; Fedor Alexeevich Bondarenko, Presnensky val, 40, kv. 101, both of Moscow; Anatoly Lvovich Gutman, ulitsa Eniseiskaya, 6, kv. 14; Vladimir Alexandrovich Presman, pereulok Kozlova, E, kv. 10, both of Minsk, all of U.S.S.R.

[22] Filed: Jan. 8, 1976

[21] Appl. No.: 647,361

[52] U.S. Cl. .......................... 116/114 AE; 116/70; 116/114 PV
[51] Int. Cl.² ........................................ G01L 19/12
[58] Field of Search ....... 116/DIG. 25, 70, 114 PV, 116/114 AE, DIG. 42; 340/240, 60; 73/38

[56] References Cited
UNITED STATES PATENTS

| | | | |
|---|---|---|---|
| 3,066,527 | 12/1962 | Stein | 73/38 |
| 3,247,824 | 4/1966 | Rodgers | 116/114 PV |
| 3,258,960 | 7/1966 | Baden | 73/118 |
| 3,556,043 | 1/1971 | Vayda | 116/114 PV |
| 3,721,789 | 3/1973 | Black | 116/114 PV |

*Primary Examiner*—S. Clement Swisher
*Assistant Examiner*—Denis E. Corr
*Attorney, Agent, or Firm*—Lackenbach, Lilling & Siegel

[57] ABSTRACT

The blockage indicator for an internal combustion engine air cleaner element has a cylindrical housing with ports provided in the cylindrical wall thereof. The housing accommodates an indicator drum which is carried on a stationary shaft mounted on the housing end wall. The cylindrical surface of the indicator drum has painted signalling areas. The indicator drum is fixed axially on the shaft and accommodates a spring adapted to turn the drum on the shaft.

The indicator housing also accommodates a spring-loaded diaphragm which forms, in conjunction with the housing, a sealed-off chamber communicating with the cleaned-air chamber of the air cleaner involved. A locking device provides interaction between the diaphragm and the indicator drum whose bottom wall faces toward the diaphragm. This constructional arrangement reduces the overall dimensions of the indicator.

17 Claims, 10 Drawing Figures

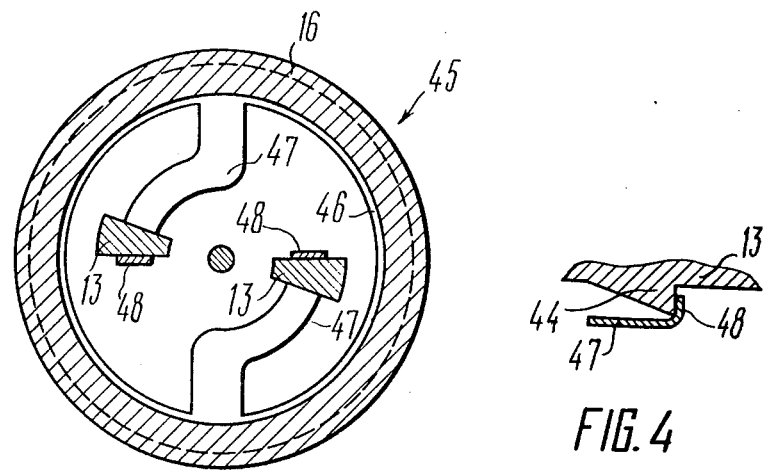
FIG. 3
FIG. 4
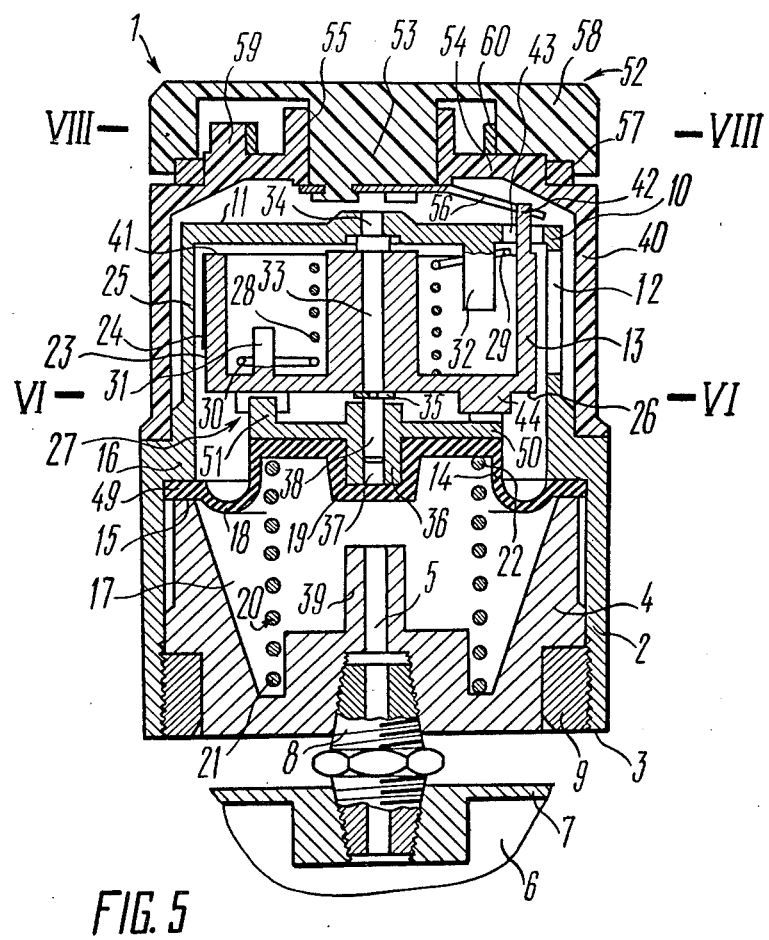
FIG. 5

BLOCKAGE INDICATOR FOR INTERNAL COMBUSTION ENGINE AIR CLEANER ELEMENT

The present invention relates to vacuum indicating devices and has particular reference to indicators of blockage of air cleaner elements employed on internal combustion engines used in such applications as motor vehicles, tractors and agricultural machines.

Dry air cleaner elements cause, in the course of service, an increase in the vacuum in the engine air intake. This conditions necesitates the use of an indicator to signal the creation of the maximum permissible vacuum in the cleaned-air chamber of the air cleaner and in this way to indicate the maximum permissible blockage of the cleaner element. It is common practice to mount such indicators directly on the air cleaner or on the air duct between the cleaner and engine.

All the air cleaner element blockage indicator known in the prior art operate on the principle of a movable resilient member, such as a corrugated rubber diaphragm or a bellows, being acted upon by the vacuum on one side and by the atmospheric pressure on the other side. The indicators are called upon to retain the warning signal after the engine is stopped and the vacuum falls off.

Known in the art is an air cleaner blockage indicator (cf., e.g., U.S. Pat. No. 3,258,960). Said indicator comprises a housing with side ports. Mounted inside the housing is a flat rubber diaphragm which functions as a non-return valve. The housing has a cover with holes for communication with the atmosphere. When the indicator is in the normal position, the diaphragm is held against the housing cover, the cover holes being closed. The indicator has a sensing chamber which is formed by a spring-loaded rubber bellows. One end of said bellows is attached to the end of the housing. The other end of the bellows is located inside the housing and is rigidly attached to an indicator drum the side surface of which has painted signalling areas. Under normal operating conditions the bellows is positioned so that the painted signalling areas do not show through the housing ports. When the vacuum in the cleaned-air chamber and, consequently, in the sealed-off sensing chamber reaches the maximum permissible value, the bellows extends while overcoming the tension of the spring (so that the flat diaphragm opens the cover holes for the atmospheric air to freely pass to the underdiaphragm chamber) and moves the indicator drum into the warning position where the painted signalling areas show through the housing ports. Once the bellows has stopped moving, the diaphragm closes the cover holes again. The bellows does not return to the normal position after the engine has stopped, since it is impeded by pressure rise in the under-diaphragm chamber. The return of the signalling element to the normal position, preceded by the air cleaner maintenance procedure, is effected by pressing a buttom which moves the diaphragm off the holes.

In the indicator under consideration the resilient member makes a considerably larger linear movement under the action of a small vacuum of the order of 0.05–0.1 kgf/cm$^2$. This indicator suffers from the disadvantage that it is liable to spontaneously cancel the warning signal after the engine has been stopped, this being due to inadequately tightened holes closed by the diaphragm. Also, the indicator drum is mounted directly on the bellows, which increases the mass of the movable part and adversely affects the indicator operation, because of the substantial vibration and jolting encountered during the operation of the engine.

Another air cleaner blockage indicator (cf., e.g. FRG Pat. No. 1,203,045) comprises a locking device which holds the indicator drum in a position relative to the housing, said device being made likewise as a non-return valve.

In said indicator the pressure being measured exerts its action upon the valve disk which is forced against the valve seat by a spring of a preset tension. The indicator drum is made fast on a collar-type diaphragm and is held in the normal position by an additional spring.

When the vacuum in the above-disk chamber reaches the maximum value, the disk while compressing the preset-tension spring, moves off the valve seat, and the sealed-off chamber accommodating the indicator drum communicates with the above-disk chamber, with the result that the indicator drum moves abruptly into the warning position and at the end of its movement closes the contacts of an electric signalling circuit. Pressures in both of the chambers mentioned above get equilized, the disk is acted upon by the preset-tension spring to move down to the seat and the indicator drum remains in the warning position even after the engine has been stopped, since its movement into the normal position is impeded by the vacuum in said sealed-off chamber.

To enable the indicator to be reset to the normal position the housing of the sealed-off chamber is made up of two thread-interconnected members. By turning either of the housing members one can withdraw the valve seat from the disk thus putting the chambers mentioned above in intercommunication. Upon returning the indicator drum to the normal position under the action of the additional spring, both housing members are reset to the initial position.

This construction of the indicator provides for electric signalling, but it suffers from all of the disadvantages of the first-mentioned indicator.

Another air cleaner blockage indicator known in the art (cf., e.g., FRG Pat. No. 1,245,641) comprises a corrugated resilient diaphragm on which an indicator drum is rigidly mounted. After the indicator drum is moved into the warning position, it is retained in this position by means of magnetic plates one of which is mounted on the bottom of the indicator drum and the other on the bottom of the indicator housing.

The indicator drum is reset to the normal position by pressing the projection of the latter which passes through a hole in the indicator housing cover. Said indicator also suffers from the disadvantages described above.

Still another air cleaner blockage indicator known in the art (cf., e.g., U.S. Pat. No. 3,556,043) comprises a signalling disk rigidly linked with a handle located outside the housing, and retained in the normal position by a stop secured at the center of a resilient diaphragm and by projections provided on said disk and adapted to interwork with the projections of the indicator housing. When the diaphragm is acted upon by the vacuum of a certain value, it moves lengthwise of the indicator axis, whereby the signalling disk likewise moves axially so that its projections move out of engagement with the projections of the indicator housing, and the disk is urged by the spring to turn about its own axis, so as to assume the warning position.

The indicator of such a construction suffers from the high mass of its movable members, the friction at the disk pivot during its axial movement which affects the accuracy of the indicator operation, and the absence of a provision for sealing the housing chamber that accommodates the signalling disk which affects the operational reliability of the indicator. The use of a seal for the disk pivot in such an indicator reduces the accuracy of the indicator operation and results in larger overall dimensions of the latter.

Still another air cleaner blockage indicator known in the art comprises a cylindrical housing closed at one end by a bottom head with a hole for the indicator to communicate with the cleaned-air chamber of the air cleaner. On the side surface of the housing, in close proximity to the other end thereof is provided at least one port. Inside the housing are accommodated an indicator drum and a resilient member constructed in the form of a spring-loaded diaphragm secured around the periphery. The indicator housing and the diaphragm form a sealed-off chamber arranged to communicate with the cleaned-air chamber of the air cleaner and to actuate the indicator drum. The bottom end of said indicator drum faces toward the diaphragm and the exterior side surface of the drum has painted signalling areas. Provision is made for a locking device to lock the indicator drum in a position relative to the indicator housing (cf., e.g., U.S. Pat. No. 3,066,527).

In the air cleaner blockage indicator under consideration the indicator drum is rigidly mounted on the diaphragm. When the vacuum in the sealed-off chamber reaches the maximum permissible value, the diaphragm moves from the normal position upwards against the load of the present-tension spring. The indicator drum moves together with the diaphragm and the painted signalling areas provided on the drum show through the indicator ports. To enable the indicator drum to be locked in the warning position projections are provided inside the indicator housing for the end of the indicator drum to bear thereagainst. For the indicator to be reset to the normal position a centering member is provided in the indicator housing. One end of said centering member rests against the bottom end of the indicator drum and the other end extends through a hole provided in the indicator housing.

The construction of the indicator provides for sure locking of the indicator drum in the warning position after the engine is stopped. However, said indicator suffers from the disadvantage that its size is comparitively large due to the fact that the diaphragm and the indicator drum make a large stroke. Another disadvantage is that the indicator drum is mounted directly on the resilient member, which increases the mass of the movable part and therefore adversely affects the operation of the indicator, because of vibration and jolting. Furthermore, the application of a contactor device for closing the electric signalling circuit involves cardinal difficulties in this construction, since the indicator drum approaches the warning position very slowly and unstably.

It is an object of the present invention to reduce the overall dimensions of the air cleaner element blockage indicator.

It is another object of the present invention to improve the reliability and longevity of the air cleaner element blockage indicator.

These objects are achieved in an air cleaner element blockage indicator, comprising a cylindrical housing one end of which is closed by a bottom head with a hole for the indicator to communicate with the cleaned-air chamber of the air cleaner involved. On the side wall of the housing, in close proximity to the other end thereof, is provided at least one port. Inside the housing are accommodated an indicator drum and a resilient member constructed in the form of a spring-loaded diaphragm secured around the periphery. The indicator housing and the diaphragm form a sealed-off chamber arranged to communicate with the cleaned-air chamber of the air cleaner. The diaphragm is arranged to actuate the indicator drum. The bottom wall of said indicator drum faces toward the diaphragm and the exterior side surface of the drum has painted signalling areas. Provision is made for a locking device to hold the indicator drum in position relative to the indicator housing.

According to the invention, the indicator drum locking device is located between the indicator drum bottom wall and the diaphragm. Said locking device is arranged to interact with the diaphragm and the indicator drum in such a manner as to lock the indicator drum in the normal position, wherein the painted signalling surface of the indicator drum does not show through the indicator housing port. The indicator drum is carried on a stationary shaft located in line with the axis of the indicator housing and is fixedly mounted on the indicator housing end wall nearest the port. The indicator drum is secured by means of a locating element which fixes the drum axially. Inside the indicator drum is mounted a spring adapted to turn the indicator drum into the warning position, wherein the painted signalling surface of the drum shows through the indicator housing port.

It is desirable that the side surface of the indicator drum should have at least one projection arranged to pass through a slot provided in the end wall opposite the bottom head, the function of said projection being to turn the indicator drum from the warning position to the normal position.

It is also desirable that the side of the indicator drum bottom wall facing toward the diaphragm be provided with at least one projection adapted for engagement with the locking device.

It is also desirable that the locking device be constructed in the form of a plate spring secured in the indicator housing between the diaphragm and the indicator drum, there being provided at least one projection adapted for engagement with said projection on the indicator drum bottom wall.

It is advantageous that the locking device be constructed in the form of a plate rigidly mounted on the diaphragm side facing the indicator drum, there being provided at least one projection located eccentrically to the diaphragm axis and adapted for engagement with the projection of the indicator drum bottom wall.

It is desirable that the ported portion of the indicator housing be provided with a transparent cap with a handle, the end wall of said cap having a hole located coaxially with the indicator drum and arranged for passage of a cylindrical projection provided on said handle, the portion of said cylindrical projection situated between the end walls of the transparent cap and indicator housing mounting an element designed for setting the indicator drum in the normal position by moving the handle.

It is also desirable that a spring be provided between the handle and the end wall of the transparent cap, the spring being arranged so that after the indicator drum is turned to the normal position said spring returns the handle into the initial position corresponds to the warning position of the indicator drum.

It is advisable that the indicator drum be provided with at least one projection adapted for engagement with the projections of the indicator housing, the purpose of this arrangement being to limit the angular movement between the normal and warning positions of the indicator drum.

It is advantageous that the indicator drum be fitted with a current conducting element for the purpose of operating an electrical signalling circuit.

The constructional features described above, viz. the signalling element in the form of an axially rotatable indicator drum and the diaphragm of simplified form, provide for high operating stability, reliability and longevity of the air cleaner element blockage indicator which constitutes the present invention. Said features also permit reducing the overall dimensions of the blockage indicator 1.5 times as compared with the designs known in the prior art.

Now the invention will be described in detail with reference to the accompanying drawings in which:

FIG. 3 is a cross-sectional view of the indicator taken on the line III—III of FIG. 1.

FIG. 4 shows a projection on the bottom end of the indicator drum and the end of the plate spring, depicted in a development of a sectional view taken on a cylindrical surface perpendicular to the plane of FIG. 3 at the radius of the circle on which the projections are located.

FIG. 5 is a longitudinal sectional view of the indicator with another embodiment of the locking device and transparent cap.

Figure 10:
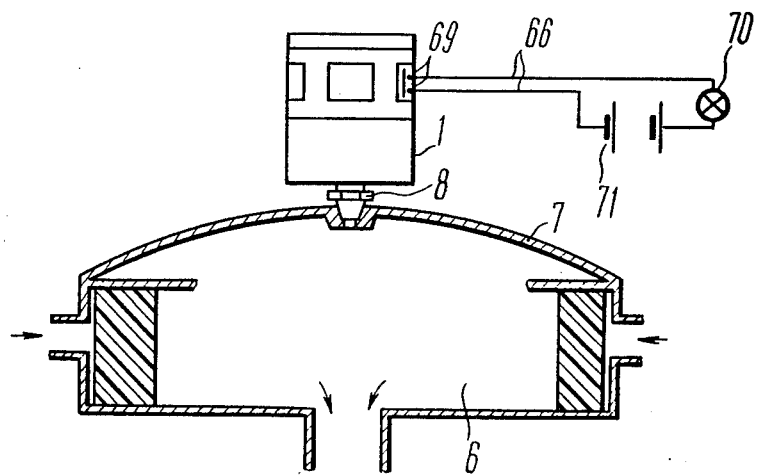

FIG. 10 diagrammatically depicts the installation of the blockage indicator on an air cleaner according to the invention.

According to the invention, the air cleaner element blockage indicator 1 (FIG. 1) comprises a cylindrical housing 2. The end 3 of the indicator housing 2 is closed by a bottom head 4. The indicator 1 communicates with the cleaned-air chamber 6 of an air cleaner 7 through a hole 5 provided in the bottom head 4 and through a union 8 mounted directly on the air cleaner 7. The bottom head 4 is secured in the indicator housing 2 by means of a nut 9. Another embodiment is possible wherein the bottom head 4 may be made to press fit in the indicator housing 2.

At the opposite end wall 11 of the indicator housing 2, the cylindrical wall 10 of said housing is provided with four ports 12 equidistantly spaced around the circumference. The indicator housing 2 accommodates an indicator drum 13 and a resilient element constructed in the form of a diaphragm 14 secured around the periphery between the circular face 15 of the bottom head 4 and the shoulder 16 of the indicator housing 2. This arrangement forms inside the indicator housing 2 a sealed-off chamber 17 communicating through the union 8 with the cleaned-air chamber 6 of the air cleaner 7.

In this embodiment of the invention the diaphragm 14 has a circular corrugation 18 the purpose of which is to render the diaphragm 14 flexible and to enable the rigid central portion 19 of the diapragm 14 to more axially in the indicator housing 2.

Another embodiment is possible wherein the resilient element may be constructed in the form of a flat diaphragm.

Located in the sealed-off chamber 17 is a helical compression spring 20 of an appropriate force. The end 21 of the spring 20 bears upon the bottom head 4, the end 22 of the spring 20 bears upon the rigid central portion 19 of the diaphragm 14.

The outer cylindrical surface 23 of the indicator drum 13 has red-painted signalling areas 24 whose width is less than the width of lands 25 between the ports 12.

The bottom wall 26 of the indicator drum 13 faces toward the diaphragm 14.

The air cleaner element blockage indicator 1 also comprises a locking device 27 for holding the indicator drum 13 in position relative to the indicator housing 2. Said locking device 27 is located between the bottom wall 26 of the indicator drum 13 and the diaphragm 14. When the rigid central portion 19 of the diaphragm 14 acts on the locking device 27, the latter fixes the indicator drum 13 in the normal position where the signalling areas 24 painted on the cylindrical surface 23 are covered by the lands 25 between the ports 12 of the indicator housing 2 and therefore said signalling areas 24 are not visible through said ports 12.

In this embodiment of the invention, inside the indicator drum 13 is mounted a helical spring 28 whose ends 29 and 30 are bent so as to engage a projection 31 on the indicator drum 13 and a projection 32 on the indicator housing 2. Said spring 28 is wound up by turning the indicator drum 13 to the normal position.

Another embodiment is possible wherein a spiral or a flat spring may be used instead of the helical spring.

The indicator drum 13 is carried on a stationary shaft 33 which is positioned in line with the axis of the indicator housing 2. The end 34 of the shaft 33 is secured to the end wall 11 of the indicator housing 2 facing the port 12 along the geometrical axis of the housing 2.

The indicator drum 13 is fixed axially by the use of a split thrust washer 35 secured on the shaft 33. Alternatively, a cotter pin, a retainer pin or a nut may be used for this purpose.

In order to keep the indicator drum 13 and the diaphragm 14 in alignment and to prevent the diaphragm 14 from cocking, a bush 36 is fitted in the diaphragm 14. The hole 37 in the bush 36 receives the other end 38 of the shaft 33.

The bottom head 4 is provided with a projection 39 the object of which is to limit the axial movement of the diaphragm 14 and thereby to prevent the end 38 of the shaft 33 from coming out of the hole 37 in the event of an excessive vacuum in the chamber 17.

Part of the indicator housing 2 is covered with a transparent cap 40 for the purpose of preventing dust and water from getting into the indicator through the ports 12.

Figure 2:
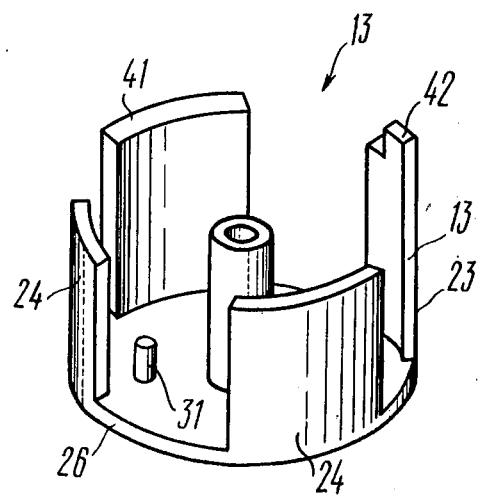
FIG. 2 is an embodiment of the indicator drum according to the invention.

In this embodiment of the invention the indicator drum 13 has a continuous cylindrical wall. Another embodiment is possible wherein the cylindrical wall may be cut out between the painted signalling areas (FIG. 2).

In the first embodiment, to facilitate resetting the indicator drum 13 (FIG. 1) in the normal position, the end 41 of the indicator drum 13 is provided with a projection 42 arranged to pass through a slot 43 provided in the indicator housing 2. The projection 42 is designed for turning the indicator drum 13 manually from the warning position to the normal position.

In order to enable the indicator drum 13 to engage with the locking device 27, four circumferentially located projections 44 are provided on the bottom wall 26 of the indicator drum 13, said projections facing toward the diaphragm 14.

In the sectional view produced by cutting the indicator drum bottom wall 26 with a circular surface perpendicular to the plane of said indicator drum bottom wall 26, at the radius of the circumference on which said projections 44 are located, the projections 44 appear as right-angled triangles (FIG. 4) whose larger side lies on the bottom wall of the indicator drum 13 and the angle between this side and the hypotenuse points toward the normal position of the indicator drum 13.

Figure 1:
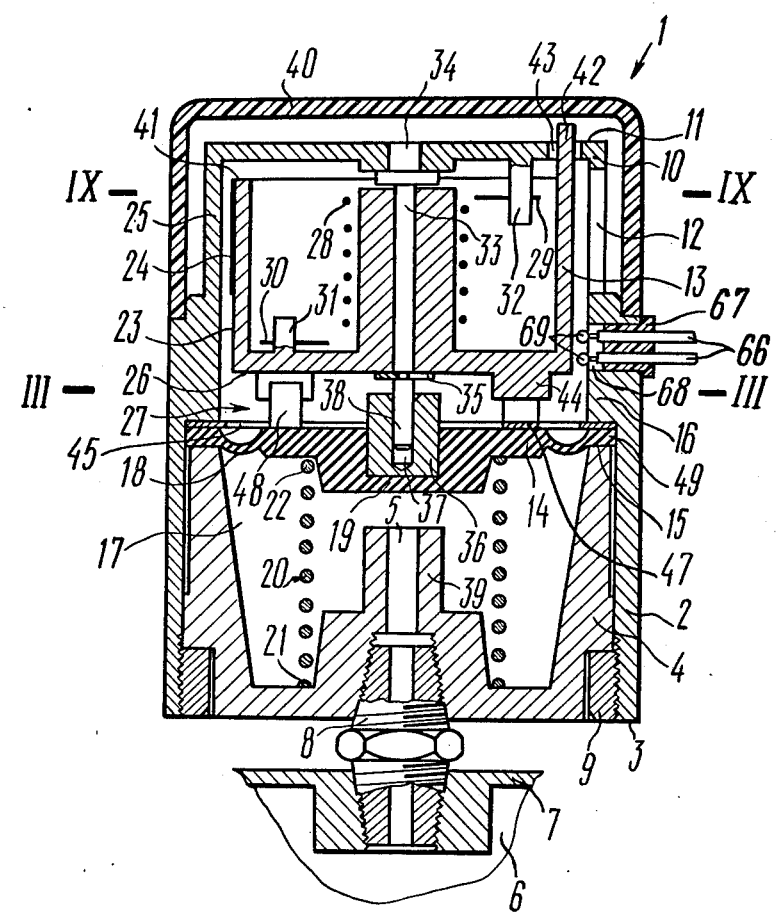
FIG. 1 is a longitudinal sectional view of the air cleaner element blockage indicator constructed according to the invention.

This arrangement facilitates setting the indicator drum 13 in the normal position and provides for sure locking of the indicator drum 13 in position relative to the indicator housing 2 (FIG. 1).

The locking device 27 is essentially a plate spring 45 (FIG. 3) in the form of a ring 46 with two projections 47 thereinside. The ends 48 of the projections 47 are bent perpendicular to the plane of the spring 45, pointing toward the indicator drum 13 (FIG. 1). Said ends 48 of the projections 47 are designated to engage with the projects 44 of the indicator drum 13.

The spring 45 is secured between the flange 49 of the diaphragm 14 and the shoulder 16 of the indicator housing 2. This constructional arrangement prevents transmission of torque from the indicator drum spring 28 to the diaphragm 14 and improves the working conditions of the diaphragm 14.

Figure 6:
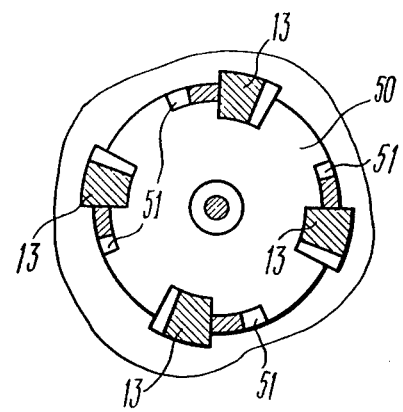
FIG. 6 is a cross section on the line VI—VI of FIG. 5.
Figure 7:
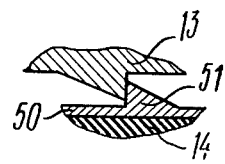
FIG. 7 shows a projection on the bottom end of the indicator drum and the plate mounted on the rigid central portion of the diaphragm, depicted in a development of a sectional view taken on a cylindrical surface perpendicular to the plane of FIG. 6 at the radius of the circle on which the projections are located.

Another embodiment of the invention is possible wherein the locking device 27 may be constructed in the form of a plate 50 (FIG. 5) fitted to the rigid central portion 19 of the diaphragm 14, on the side thereof facing the indicator drum 13. Said plate 50 has four projections 51 adapted for engagement with the projections 44 of the indicator drum 13. The projections 51 (FIG. 6) are located on the plate 50 circumferentially. In the sectional view produced by cutting the plate 50 with a cylindrical surface perpendicular to the plane of said plate 50, at the radius of the circumference on which said projections 51 are located, the projections 51 appear as right-angled triangles (FIG. 7) whose larger side lies on the plate 50 and the angle between this side and the hypotenuse points toward the warning position of the indicator drum 13.

This constructional arrangement facilitates setting the indicator drum 13 in the normal position, provides for sure locking of the indicator drum in position relative to the indicator housing and improves the operation of the indicator.

Provided at the center of the late 50 (FIG. 5) is a hole into which freely fits the shaft end 38. The object of this constructional arrangement is to align the diaphragm 14, eliminate diaphragm cocking during movement and also improve indicator performance.

Embodiments of the indicator 1 are possible, wherein the plate 50 may be secured by beading or through a threaded joint, or said plate 50 may be made of polymer materials and secured by fusion.

A handle 52 is mounted on the transparent cap 40 in order that after the operation of the indicator 1 or after carrying out preventive maintenance of the air cleaner, the indicator drum 13 can be reset in the normal position without removing the cap 40. The latter is fixed relative to the housing by virtue of being pressed on or by means of an adhesive. In the embodiment of the present invention described herein the handle 52 is made of a polymer material. The handle 52 has a cylindrical projection 53 which fits through a hole 55 provided in the end wall 54 of the cap 40 coaxially with the indicator drum 13. An element 56 adapted for turning the indicator drum 13 into the normal position is mounted on the cylindrical projection 53 between the end wall 54 of the cap 40 and the end 11 of the indicator housing 2. The attachment of said element 56 is effected by fusing the material of the handle. The indicator drum is turned by interaction between the element 56 and the projection 42 on the indicator drum 13.

Figure 8:
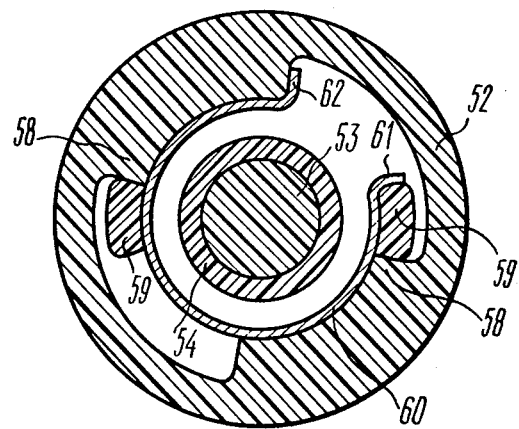
FIG. 8 is a cross section on the line VIII—VIII of FIG. 5.

Fitted between the handle 52 and the cap end wall 54 is a felt sealing ring 57. Inside the handle 52 (FIG. 8) and on the cap end wall 54 are provided projections 58 and 59 respectively. The object of these projections is to limit the angular movement of the handle 52 between the normal and warning positions of the indicator drum 13.

The handle 52 is returned to the initial position corresponding to the warning position of the indicator drum 13 by provision of a spring 60 between the handle 52 and the end wall 54 of the transparent cap 40.

The spring 60 is constructed in the form of a split ring with radially bent ends. The end 61 of the spring 60 is pressed to the projection 59 of the cap 40, the other end 62 of the spring 60 is attached to the projection 58 of the handle 52. When the handle 52 is turned to bring the indicator drum 13 into the normal position, the spring 60 becomes wound and thereby torque is produced for returning the handle 52 into the initial position. The element 56 takes the position where it does not interfere with the turning of the indicator drum 13 (FIG. 5) to the warning position.

Figure 9:
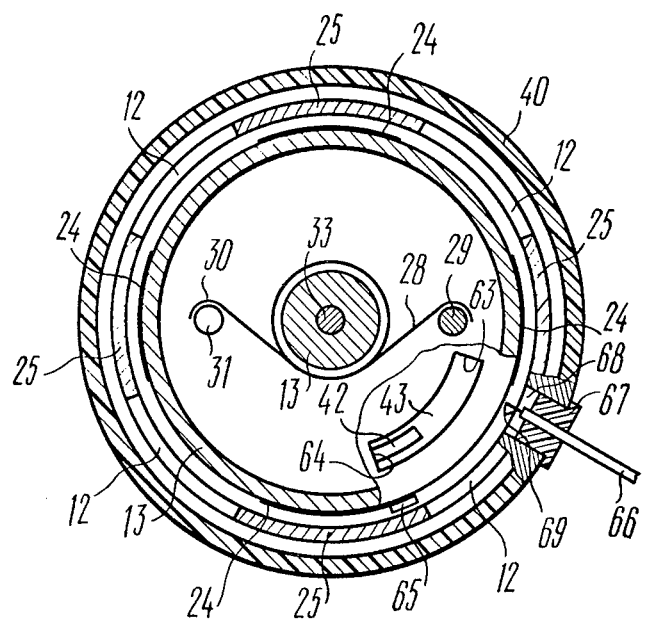
FIG. 9 is a cross section on the line IX—IX of FIG. 1.

To limit the angular movement of the indicator drum 13 between the normal and warning positions, i.e. to prevent the possibility of the signalling areas 24 being displaced relatively to the ports 12 and the lands 25, use is made of the projection 42 adapted to engage with the radial walls 63 and 64 of the slot 43 in the indicator housing 2 (FIG. 9).

To provide for electrical signalling of air cleaner element 7 blockage, a current conducting element 65 is mounted on the indicator drum 13, said element 65 being attached by means of glue which insulates it from the drum 13. Electrical wires 66 are run through a grommet 67 which is fitted in a hole 68 in the indicator housing 2. At the ends of the wires 66 are provided two contacts 69 arranged to be closed by the current conducting element 65 at the warning position of the indicator drum 13.

The electric circuit also comprises an indicating lamp 70 (FIG. 10) and a power source 71.

Any other embodiments of the electric circuit known in the art may be employed.

The air cleaner filter blockage indicator which constitutes the present invention operates as follows:

The air cleaner element blockage indicator 1 (FIG. 1) is in the normal position when the engine is dead and there is no vacuum in the chamber 17 or when the engine operates with the vacuum in the chamber 17 below the maximum permissible value. Under these conditions the spring 20 holds the diaphragm 14 at the end of its stroke toward the indicator drum 13. The bent ends 48 pressed to the diaphragm 14 of the projections 47 on the plate spring 45 are in engagement with the projections 44 on the bottom wall of the indicator drum 13. The indicator drum 13 is in the position where the red signalling areas 24 do not show through the ports in the indicator housing 2 (the indicator drum 13 is set in this position by means of the handle 52 (FIG. 5). When setting the indicator drum 13 in the normal position, the spring 28 mounted inside the indicator drum 13 becomes wound and remains in the wound state until the air cleaner element blockage indicator 1 comes into action.

When the vacuum in the cleaned-air chamber 6 of the air cleaner 7 and, consequently, in the chamber 17 reaches the maximum permissible value, the load of the spring 20 is no longer sufficient to retain the diaphragm 14 in the normal position and the atmospheric pressure causes the diaphragm 14 to make a stroke toward the bottom head 4. The projection 47 of the plate spring 45, which are rigidly attached to the rigid central portion 19 of the diaphragm 14, bend and the ends 48 fo the projections 47 on the spring 45 disengage from the projections 44 on the indicator drum 13. The spring 28 sharply turns the indicator drum 13 into the warning position. The projection 42 (FIG. 9) on the indicator drum 13 comes up against the slot wall 63, thereby limiting the angular movement of the indicator drum 13, and said indicator drum 13 takes up the position where the red signalling areas 24 show through the ports 12 in the indicator housing 2, being visible through the transparent cap 40.

The indicator drum 13 remains in the warning position until it is reset in the normal position.

For remotely operated light signalling, an indicating lamp 70 (FIG. 10) is fitted in the vehicle instrument panel (not shown in the drawing). When the vacuum in the chamber 17 reaches the maximum permissible value, the indicator drum 13 turns to the warning position. The current conducting element 65 mounted on the indicator drum 13 closes the contacts 69 and thereby completes the signalling circuit. The current passes from the upper source 71 through the wires 66 and indicating lamp 70 comes one.

The air cleaner element blockage indicator which constitutes the present invention features high performance stability, small size and longevity and can be used to advantage with air cleaners employed on the engines of motor vehicles, tractors and agricultural machines.

What is claimed is:

1. A blockage indicator for an internal combustion engine air cleaner element, comprising: a cylindrical housing; a bottom head at one end of said housing, said bottom head having a hole for the indicator to communicate with the air cleaner involved; at least one ported portion provided on the side wall of the housing, in close proximity to an other end of said housing; a resilient member constructed in the form of a spring-loaded diaphragm, secured around the periphery of said housing and being inside the housing; a sealed-off chamber being defined between said diaphragm and said bottom head and arranged to communicate with the air cleaner; a stationary shaft mounted on said other housing end axially in line with the housing axis; an indicator drum accommodated inside said housing and mounted on said stationary shaft, the bottom wall of said indicator drum facing toward said diaphragm; a locating element fixing said indicator drum axially in said housing; painted signalling areas on an external side surface of said indicator drum; a spring mounted inside said indicator drum and adapted to turn the indicator drum to a warning position in which the painted signalling surface shows through the housing ported portion; a locking device to hold said indicator drum in position relative to said housing, said locking device being located between the indicator drum bottom wall and the diaphragm and being arranged to interact with the diaphragm and the indicator drum in such a manner as to lock the indicator drum in a normal position where the painted signalling surface of the indicator drum does not show through the housing ported portion.

2. A blockage indicator for an internal combustion engine air cleaner element, as claimed in claim 1, further comprising; at least one projection provided on a top surface of the indicator drum and arranged to pass through a slot provided in the other end of the indicator housing, the function of said projection being to turn the indicator drum from the warning position to the normal position.

3. A blockage indicator for an internal combustion engine air cleaner element, as claimed in claim 2, comprising: at least one projection provided on the side of the indicator drum bottom wall facing toward the diaphragm and designed to engage with said locking device.

4. A blockage indicator for an internal combustion engine air cleaner element, as claimed in claim 2, comprising: said ported portion of the indicator housing; a transparent cap adapted to cover said ported portion of the indicator housing and having a hole; a handle mounted on said transparent cap; a cylindrical projection provided on said handle and adapted to pass through said hole in the transparent cap; an element designed for setting said indicator drum in the normal position and mounted on said cylindrical projection of the handle between said transparent cap and the other end of the indicator housing.

5. A blockage indicator for an internal combustion engine air cleaner element, as claimed in claim 4, comprising: a spring mounted between the handle and the transparent cap, said spring being arranged so that after the indicator drum is turned to the normal position said spring returns the handle to an initial position corresponding to the warning position of the indicator drum.

6. A blockage indicator for an internal combustion engine air cleaner element, as claimed in claim 2, comprising: at least one projection provided on said indicator drum and at least two projections provided inside said indicator housing and arranged to engage with said projection on the indicator drum, the object of this arrangement being to limit the angular movement of the indicator drum between the normal and warning positions thereof.

7. A blockage indicator for an internal combustion engine air cleaner element, as claimed in claim 2, comprising: a current conducting element fitted on the indicator drum for the purpose of operating an electrical signalling circuit.

8. A blockage indicator for an internal combustion engine air cleaner element, as claimed in claim 1, comprising: at least one projection provided on the indicator drum bottom wall side facing toward the diaphragm, said projection being adapted for engagement with said locking device.

9. A blockage indicator for an internal combustion engine air cleaner element, as claimed in claim 8, comprising: a plate spring constituting said locking device; at least one projection provided on said plate spring for engagement with said projection on the bottom wall of the indicator drum.

10. A blockage indicator for an internal combustion engine air cleaner element, as claimed in claim 8, comprising: a plate constituting said locking device, said plate being rigidly mounted on said diaphragm, on the side thereof facing toward the indicator drum; at least one projection provided on said plate and located eccentrically to the axis of the diaphragm, said projection being designed for engagement with the projection provided on the bottom wall of the indicator drum.

11. A blockage indicator for an internal combustion engine air cleaner element, as claimed in claim 8, comprising: said ported portions of the indicator housing; a transparent cap adapted to cover said ported portion of the indicator housing and having a hole; a handle mounted on said transparent cap; a cylindrical projection provided on said handle and adapted to pass through said hole in the transparent cap; an element deisgned for setting the indicator drum in the normal position and mounted on said cylindrical projection of the handle between the transparent cap and the other end of the indicator housing.

12. A blockage indicator for an internal combustion engine air cleaner element, as claimed in claim 11, comprising: a plate spring constituting said locking device; at least one projection provided on said plate spring for engagement with said projection on the bottom wall of the indicator drum.

13. A blockage indicator for an internal combustion engine air cleaner element, as claimed in claim 8, comprising: at least one projection provised on said indicator drum and at least two projections provided inside said indicator housing and arranged for engagement with said projection on the indicator drum, the object of this arrangement being to limit the angular movement of the indicator drum between the normal and warning positions thereof.

14. A blockage indicator for an internal combustion engine air cleaner element, as claimed in claim 13, comprising: a plate constituting said locking device, said plate being rigidly mounted on said diaphragm, on the side thereof facing toward the indicator drum; at least one projection provided on said plate and located eccentrically to the axis of the diaphragm, said projection being designed for engagement with the projection on the bottom wall of the indicator drum.

15. A blockage indicator for an internal combustion engine air cleaner element, as claimed in claim 1, comprising: said ported portion of the indicator housing; a transparent cap adapted to cover said ported portion of the indicator housing and having a hole; a handle mounted on said transparent cap; a cylindrical projection provided on said handle and adapted to pass through said hole in said transparent cap: an element designed for setting said indicator drum in the normal position and mounted on said cylindrical projection between said transparent cap and the other end of said indicator housing.

16. A blockage indicator for an internal combustion engine air cleaner element, as claimed in claim 15, comprising: a spring mounted between the handle and the transparent cap, said spring being arranged so that after the indicator drum is turned to the normal position said spring returns the handle to the initial position corresponding to the warning position of the indicator drum.

17. A blockage indicator or an internal combustion engine air cleaner element, as claimed in claim 1, comprising: at least one projection provided on said indicator drum; at least two projections provided inside said indicator housing and arranged to engage with said projection on the indicator drum for the purpose of limiting the indicator drum angular movement between the normal and warning positions.

* * * * *